Feb. 4, 1941. H. G. WEDLER 2,230,660

TIRE CASING REPAIR DEVICE

Filed Oct. 3, 1939

INVENTOR.
HARRY G. WEDLER
BY Saywell & Wesseler,
ATTORNEYS.

Patented Feb. 4, 1941

2,230,660

UNITED STATES PATENT OFFICE 2,230,660

TIRE CASING REPAIR DEVICE

Harry G. Wedler, St. Louis, Mo., assignor to Kex Company, Incorporated, St. Louis, Mo., a corporation of Missouri Application October 3, 1939, Serial No. 297,725

3 Claims. (Cl. 152—370)

This invention as indicated relates to a tire casing repair device. More particularly, it comprises a repair device having a head section and a plug section of the shape generally referred to as the mushroom type of plug. The invention provides for a plug having a head section which is so shaped as to conform in a higher degree to the contour of the inner wall surface of a tire casing and thus avoid all tendency to apply an inward pull upon the stem portion of the plug which would act to draw the same inwardly leaving an annular space adjacent the base of the puncture aperture where the head would not be in full contact with the inner wall surface of the casing. The invention also has in view the shaping of the outer surface of the head to likewise decrease the tendency of the head of the plug to pull the stem inwardly, but under any of the constructions the shape of the plug is such as to always provide an adequate degree of pressure on the plug head to maintain the same in pressure contact with the inner wall of the tire casing.

Heretofore it has been the practice to provide mushroom shaped plugs for repairing puncture apertures in tire casings wherein the end surface of the head of the plug opposed to the surface to which the stem was attached was of convex outline and the inner surface to which the stem portion was connected was of flat or plane outline, as seen in cross section. With a plug of the outline just mentioned, the tendency has been, where such plug has been applied to a curved surface, and the head was of substantial thickness, to provide a degree of inward pull upon the plug stem which served at times to draw the stem inwardly away from its position in the puncture aperture and to provide an area of space out of contact with the inner casing wall adjacent the point of juncture of the stem section with the head section of the plug. In order to prevent the action just described and still insure sufficient resilient contact of the inner surface of the head with the adjacent wall of the tire casing, the present invention provides a plug head which may be brought into puncture sealing position with less movement after the margins of the head contact the inner walls of the tire casing, and thus be seated in position with less flexing of the head and substantially no tendency to pull the stem out of the puncture aperture or to cause the formation of free space between the central portions of the head and the inner wall of the tire casing.

The principal object of the present invention is to provide a tire casing repair plug having a head portion and a stem portion with the upper surface of the head portion, as seen in cross section, formed on an arc of curvature, the radius of such arc preferably being appreciably longer than the radius of the arc of the adjacent inner wall of the tire casing against which the inner surface of the head of such plug is brought into contact.

Another object of the invention is to provide a tire casing repair plug having a head section and a stem section wherein the surface of the head of the plug to be brought into contact with the tire casing is formed upon a radius of curvature greater than the radius of curvature of the tire casing which it is to contact, and wherein the outer surface of the head of the plug is of a contour, as seen in cross section, to provide a structure which will permit the full conformation of such curved contact surface of the plug without a tendency to pull the stem of the plug and the adjacent surface of the head away from the inner wall of the tire casing.

Another object of the invention is to provide a mushroom type of tire casing repair plug adapted to be inserted in the puncture aperture of the tire casing by means of any of the well known methods of applying such stems through puncture apertures, and when so applied to adhere closely to the conformation of the inner wall of such tire casing with a minimum tendency to move away from such surface during the entire service life of such plug in puncture sealing relation to the tire casing.

Other and further objects of the invention will appear in the course of the following description.

To the accomplishment of the foregoing and related ends, said invention, then, consists of the means hereinafter fully described and particularly pointed out in the claims, the annexed drawing and the following description setting forth in detail certain structures embodying the invention, such disclosed means constituting, however, but several of various forms in which the principle of the invention may be used.

Figure 1:
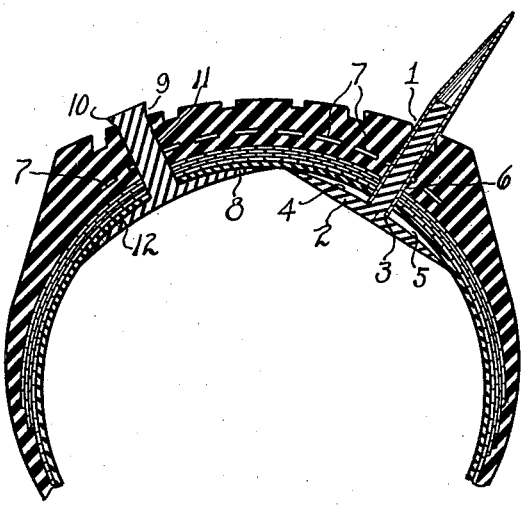
Figure 1 is a fragmentary transverse sectional view of a tire casing showing a plug embodying the principles of the invention in puncture sealing relation therewith, and another plug embodying the principles of the invention in course of application to a puncture through said tire casing.

As is clearly shown in Figure 1 of the drawing, the tire casing repair device comprises a mushroom shaped plug having a stem section 1 and a head section 2, the head section having a plane or flat outer surface 3 and a convex or curved inner surface 4, such curvature on the inner surface being upon a radius greater than the radius of the inner wall 5 of the tire casing 6 through a puncture aperture 7 of which the stem of the repair device is to be inserted.

When the plug is inserted in the puncture aperture, the inner surface of the head portion thereof will assume an arc of curvature 8 conforming exactly to the arc of curvature of the inner wall of the tire casing, as is disclosed in the repair device 9 shown in applied puncture sealing position in Figure 1. It will be noted that the excess portion of the stem has been cut off slightly above the outer surface of the tire casing leaving an expanded end portion 10 of the plug projecting beyond the surface of the casing. It will also be noted that the body of the stem 11 within the puncture aperture 7 of the tire casing has expanded into close contact with the walls of the puncture aperture to completely seal the same. The flat outer surface of the plug, after the plug is in puncture sealing relation, will be held in an arc of curvature 12 which will be somewhat greater than the radius of curvature of the inner face thereof, as seen in cross section.

Figure 2:
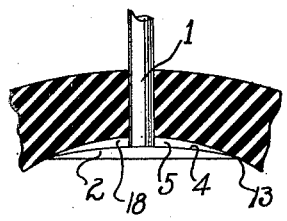
Figure 2 is a fragmentary transverse sectional view of a tire casing showing a side elevation of a tire casing repair plug with the stem portion thereof engaged in a puncture aperture in said tire casing with the head portion shown in its first stage of contact with the inner wall of the tire casing.
Figure 3:
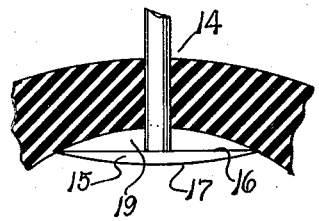
Figure 3 is a view similar to Figure 2, but showing a plug of conventional type with the head portion thereof in its first stage of contact with the inner wall of the tire casing.

The distinction in the action of a plug having an inner surface of the character above described is clearly disclosed in Figures 2 and 3. It will be noted that in Figure 2, the inner surface 4 of the plug is spaced a less distance from the inner wall 5 of the tire casing at the time its marginal portions 13 first contact such wall than in the case of a plug 14 having a head 15 of conventional construction wherein the inner surface 16 is flat and the outer face 17 is of convex shape. The drawings in Figures 2 and 3 are made to the same scale and the space 18 between the inner surface of the plug and the inner wall of the tire casing in Figure 2 is approximately one half of the space 19 between the inner surface of the plug and the inner wall of the tire casing shown in Figure 3. Since the head thickness is substantially the same in each of the plugs shown in Figures 2 and 3, it is obvious that the degree of tension applied to the stem of the plug by the resilient action of the head will be greater in the case of the plug head shown in Figure 3 than in the case of the plug head shown in Figure 2. Thus through the provision of a convex inner surface on the head of the plug, as illustrated in Figure 2, a full area of contact with the inner wall of the tire casing adjacent the puncture aperture will be provided for without having an amount of pressure exerted by the head of the plug to draw the inner plug surface and stem out of full puncture sealing position, as shown in the left hand portion of Figure 1.

Figure 4:
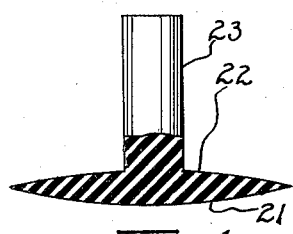
Figure 4 is a side elevation showing a modified form of a tire casing repair device wherein the head section of a plug is formed with a convex surface on its inner and outer sides.
Figure 5:
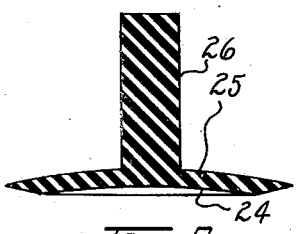
Figure 5 is a transverse vertical sectional view of a modified form of tire casing repair device wherein the head section of the plug is formed with a convex surface on its inner side and with a concave outer surface substantially parallel thereto.

Besides forming a plug with a convex inner surface and a flat or plane under surface, the head of the plug may be provided, as shown in Figure 4, with a convex outer surface 21, the balance of the plug comprising the convex inner surface of the plug 22 and the stem of the plug 23 being of conventional construction. Another variation in the shape of the outer surface at the head of the plug is illustrated in Figure 5, wherein a concave outer surface 24 is provided on the plug with the inner surface of the plug 25 being of convex shape and substantially parallel to the curvature of the outer surface, as seen in outline, with the stem 26 connected centrally with the convex inner surface of the head.

Figure 6:
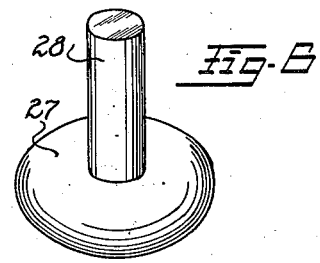
Figure 6 is a perspective view of a plug of the type shown in Figures 1 and 3.

While the plug may be made of various shapes as seen in plan, so long as the curvature on the upper surface is provided to conform with a slight degree of resiliency to the curvature of the inner wall of the tire casing, the preferred form of plug will have a head section of circular outline, the inner surface 27 thereof, as shown in Figure 6, presenting the outline of the segment of a sphere. The underside of said plug may be a flat or plane surface, as has been stated, and the stem of said plug 28 will engage the convex inner surface of the head at a central position.

In Figure 1 the plug has been shown as provided with an inserting device in the form of a metal quill covered in U. S. Patent No. 1,702,031, wherein the plug stem is precompressed preliminary to inserting the same in the puncture aperture. Other types of inserting devices may be used with plugs having the features of construction shown in the several figures of the drawing. In each instance the plug stem is compressed as it passes through the puncture aperture, and upon release from the inserting tool expands to puncture sealing relation with the adjacent torn walls of the puncture aperture. This relation is easily maintained under all operative conditions of the tire where the inward pressure of the head has been reduced to a point where the action is to keep the head surface in contact with the adjacent inner surface of the tire casing without exerting an inward pull upon the stem with the formation of a spaced area adjacent the base of the stem. The head and stem of the plugs may be formed in graduated sizes for the repair of different types of tires and for use in connection with different types of punctures. Thus, for repairing punctures in the tires used on heavy truck and buses and the like, it has been found desirable to use a plug with a head of large size and a stem proportionately larger than where the same are to be used in repairing tires for lighter automobiles intended for private use exclusively.

Other modes of applying the principle of my invention may be employed instead of those explained, change being made as regards the structure herein disclosed, provided the means stated by any of the following claims or the equivalent of such stated means be employed.

I therefore particularly point out and distinctly claim as my invention:

1. A repair plug for a tire casing having in combination, a head section and a stem section, such head section having an inner surface around the point of juncture with the stem formed as a segment of a sphere.

2. A repair plug for a tire casing having in combination, a head section and a stem section, such head section having an inner surface around the point of juncture with the stem formed as a segment of a sphere and having a flat outer surface.

3. A repair plug for a tire casing having in combination, a stem section adapted to be engaged in puncture sealing relation in the puncture aperture of a tire casing, an enlarged head section on one end of said stem adapted to abut against the inner wall of the tire casing, the marginal portions of said head being positioned outwardly of the point of juncture of the head and stem to reduce the degree of flexing of said head section and tension on said stem section when said plug is in puncture sealing position.

HARRY G. WEDLER.